(12) United States Patent
Jayaprakash et al.

(10) Patent No.: US 10,540,503 B2
(45) Date of Patent: Jan. 21, 2020

(54) SYSTEM AND APPROACH TO CONVEY DATA WITH A HANDHELD DEVICE VIA A MULTI-DIMENSIONAL CODE

(71) Applicant: Honeywell International Inc., Morristown, NJ (US)

(72) Inventors: Meruva Jayaprakash, Bangalore (IN); Deenadayalan Karunakaran, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 14/710,968

(22) Filed: May 13, 2015

(65) Prior Publication Data
US 2015/0242642 A1    Aug. 27, 2015

Related U.S. Application Data

(63) Continuation of application No. 13/603,308, filed on Sep. 4, 2012, now Pat. No. 9,038,897.

(51) Int. Cl.
*G06K 19/00*    (2006.01)
*G06F 21/60*    (2013.01)
*G06F 16/955*   (2019.01)

(52) U.S. Cl.
CPC ........ *G06F 21/602* (2013.01); *G06F 16/9554* (2019.01)

(58) Field of Classification Search
USPC .................... 235/375, 435, 439, 454, 462
See application file for complete search history.

(56) References Cited

U.S. PATENT DOCUMENTS

| | | | |
|---|---|---|---|
| 7,287,696 B2 | 10/2007 | Attia et al. | |
| 8,560,012 B2 | 10/2013 | Ohnishi et al. | |
| 8,593,291 B2 | 11/2013 | Townsend et al. | |
| 9,038,897 B2 | 5/2015 | Jayaprakash et al. | |
| 9,064,219 B2 | 6/2015 | Hall et al. | |
| 2005/0011957 A1* | 1/2005 | Attia ................ | G06F 17/30879 235/462.46 |
| 2005/0092839 A1 | 5/2005 | Oram | |

(Continued)

OTHER PUBLICATIONS

All Foreign and NPL References Have Been Previously Provided in U.S. Appl. No. 13/603,308, filed Sep. 4, 2012.

(Continued)

*Primary Examiner* — Matthew Mikels
(74) *Attorney, Agent, or Firm* — Seager, Tufte & Wickhem LLP (57) ABSTRACT

A system and approach for conveying engineering and license data with a handheld or mobile device via a multi-dimensional code. Engineering data from a page such as a schematic may be generated, formatted, and encoded with a multi-dimensional code. The code in a visual presentation may be embedded in the schematic. A mobile device may scan the code. The device with an appropriate application may decode and un-format the engineering data from the code for a consumer or user. License data may be generated, encrypted, and encoded in a multi-dimensional code. The code in a visual presentation may be scanned and decrypted by the mobile device with an appropriate application, for a consumer or user.

14 Claims, 7 Drawing Sheets

(56) References Cited

U.S. PATENT DOCUMENTS

| | | | |
|---|---|---|---|
| 2006/0171535 A1* | 8/2006 | Omae | G06F 21/10 380/201 |
| 2007/0176000 A1 | 8/2007 | Cattrone et al. | |
| 2008/0000991 A1* | 1/2008 | Yin | G06K 1/123 235/494 |
| 2008/0168431 A1* | 7/2008 | Ito | G06F 8/443 717/154 |
| 2010/0315248 A1* | 12/2010 | Townsend | G01B 7/16 340/635 |
| 2012/0036225 A1* | 2/2012 | Chor | G06F 17/30879 709/219 |

OTHER PUBLICATIONS

Gilroy Business Focus, vol. 30, No. 5, pp. 2 and 11, printed Jun. 2011.

* cited by examiner

SYSTEM AND APPROACH TO CONVEY DATA WITH A HANDHELD DEVICE VIA A MULTI-DIMENSIONAL CODE

This application is a continuation of U.S. patent application Ser. No. 13/603,308, filed Sep. 4, 2012. U.S. patent application Ser. No. 13/603,308, filed Sep. 4, 2012, is hereby incorporated by reference.

BACKGROUND

The present disclosure pertains to data transfers and particularly to utilizing matrix codes to provide such transfers. More particularly, the disclosure pertains to a use of handheld and mobile devices to facilitate the data transfers.

SUMMARY

The disclosure reveals a system and approach for conveying engineering and license data with a handheld or mobile device via a multi-dimensional code. Engineering data from a submitted page such as a schematic may be generated, formatted, and encoded with a multi-dimensional code. Encoded data may be optionally encrypted for security reasons, so that other applications cannot interpret the same code which is generated from the present applications. On the other hand, one type of encoding may be encryption of the data.

The code in a visual presentation may be embedded in the schematic. A mobile device may scan the code. The device with an appropriate application may decode and un-format the engineering data from the code for a consumer application or user. License data may be generated, encrypted, and encoded in a multi-dimensional code. The code in a visual presentation may be scanned and decrypted by the mobile device with an appropriate application, for a consumer application or user.

DESCRIPTION

The present system and approach, as described herein and/or shown in the Figures, may incorporate one or more processors, computers, controllers, user interfaces, wireless and/or wire connections, and/or the like, wherever desired.

Multi-dimensional codes may be used in communications. For example, a quick response (QR) code may be widely used in the advertisements to encode a company's web link. The QR code may be a specific multi-dimensional machine readable code that is designed to be read by portable optical type reading mechanisms such as smart phones. The information encoded may be text, a URL, or other data. The word group "QR Code" may be a trademark of Denso Wave Incorporated in the geographical areas of Japan, United States of America, Australia and Europe. Other multi-dimensional machine readable codes may be utilized in the present system and method.

An example multi-dimensional code may be a 2D (two-dimensional) barcode that is a graphical image that stores information both horizontally, as one-dimensional bar codes do, and vertically.

One main feature may be how the 2D code can be used to encode virtually all required design and functional characteristics of the HVAC device/panel, and so on. The data may be read and consumed directly into the application in offline. It does not necessarily require any other machine or server to fetch the data.

The scenarios incorporated herein do not necessarily contain multi-dimensional codes that represent actual end results. For example, a QR code for encrypted license information and a QR code for a compressed schematic are not necessarily available. They may be explained in text form to describe the idea, but in reality they should be in binary encoded QR form.

There may be various new scenarios for use of a QR Code™ or other multi-dimensional codes. Other versions of visual machine readable codes may be read. As an example of a code, the QR code may be used herein for illustrative purposes in the description of the present system and method.

In one scenario, a company's field technicians and sub-contractors may use handheld/mobile devices to perform their commissioning activities such as wiring checkout, functional checkout, VAV balancing, tuning of the HVAC application parameters, and so forth. The company's service engineers may also use a mobile device for performing their tasks at the job sites. The engineers may generate module labels, module graphics, and wiring diagrams from the engineering tools to paste them on to the devices. Field technicians may refer to these details on the devices and panels in order to perform their tasks. Sometimes the technicians may have to manually read those details such as device IDs, point names, and so forth, and enter the mobile applications to query or record items. The module labels/graphics may be sometimes not necessarily clearly visible for certain technicians due to font size, or bad lighting in the environment, or due to spoiled labels.

In another scenario, a company may provide handheld devices and relevant applications to sub-contractors for performing certain tasks like wiring checkout, variable air velocity (VAV) balancing, and so forth. Since the devices may be with non-company users, the company engineers might restrict access of these devices by requiring licenses. Thus, once the application is installed in a target mobile device, initially the company technician may transfer a license certificate to the device to make use of the application for a limited period (e.g., the license may be typically issued for a month or even a fewer number of days). The commissioning tools running in the mobile device may either require device/project data to be entered manually or allow importing of project data through some flat files. Project data may include controller details and point details.

Another scenario may also be introduced like a floor plan with positions of sensors and devices that can be encoded in QR code or other code form. This may be useful for the electrical technicians and commissioning engineers to get data of fire detectors and control modules and their location information into the mobile application.

Transfer of the license details and project details from a laptop to a mobile device may be done through wireless communication such as Wi-Fi. To transfer the details, an online application in the laptop may need to discover the handheld device through wireless communication. Upon successful discovery, the laptop may send the details to the handheld device either through file transfer or through some other proprietary network protocol. To make a desktop and a handheld device visible in the wireless network, the connection may require a wireless gateway in between or the device may have to establish point-to-point wireless connection. Engineers may put up some effort to establish this connectivity for transferring a few bytes of licensing data. Also this mechanism is not necessarily very convenient for engineers in nearly all the situations. Sometimes the engineers might want to do this task where wireless gateway is not necessarily available.

The latest technology may be used to automate the data transfer in a much easier way and to avoid manual entry of the data by reading module labels and wiring diagrams to reduce human error and to improve productivity of the field technicians.

The present approach may use, for example, the quick response (QR) code to transfer a small amount of data from documents and computer applications to a mobile device.

In one solution, a computer based application may encrypt raw license information. The encrypted license information may be encoded into a quick response code and displayed to the user (e.g., via a monitor). The user may launch a mobile application or launch an HVAC application in a mobile device, and scan a QR code on the laptop monitor so as to transfer license data to a mobile device, i.e., the mobile device/application may capture the quick response code through its camera and decode the quick response code into encrypted license data. The encrypted license data may be decrypted and translated into raw license information that will be registered in the application.

In another solution, a computer based application may encode text and/or raw binary HVAC engineering data into a quick response code and display the quick response code on a monitor. The mobile application may use a camera to capture the quick response code from the monitor and decode the code, and import or make use of the decoded information in the application.

In still another solution, HVAC schematics, wiring diagrams, system architecture, sequence of operations, AHU/VAV or other equipment/device schedules and other hardware submittal images, and respective key text information (e.g., such as device name, point details, and so forth) may be encoded into a quick response code. The quick response code may be embedded into a submittal document page. Typically, each submittal page may have the quick response code. Whenever a field technician needs this data in the mobile application, the technician may point a mobile device to the quick response code displayed in a hard copy or in a soft copy of the submittal image and transfer the data into the application.

In still another solution, each HVAC device may have a QR code pasted on top of it with details such as a device unique ID, manufacturing IDs, a warranty date, a web link for help, and so on. A field technician may read the QR code with a mobile application, in conjunction with a camera, to connect to the respective help places in the web-site, or to find out warranty data, the unique device ID, and so forth.

In still another solution, module labels and module graphics of HVAC devices may be generated with a QR code that can be pasted onto a device. The device ID and other key details may be encoded in the QR code for an easy transfer of data to mobile devices during service and/or in commissioning time.

In still another solution, raw data may be compressed and a QR code may be generated for the compressed data. The compressing of the raw data may be required due to maximum size limitation of data of the QR code.

Various uses of the QR code may incorporate: 1) Using a QR code in HVAC wiring diagrams, schematics, module labels, module graphics, and other printed material of submittals; 2) Using the QR code to transfer an encrypted license certificate to a mobile device; 3) Generating and interpreting the QR code with an HVAC image and text information; 4) Generating and interpreting the QR code with compressed binary data; and 5) Generating and interpreting the QR code with encrypted binary data.

The QR code may be used in advertisements to encode a company's web-links and personnel email IDs. The QR code also may be used in HVAC domain/products to represent certain critical data in its documents in a QR code form and transfer the QR coded data to mobile devices for commissioning applications.

Often, mobile devices may come with applications that can scan QR codes. And also several vendors may supply QR code generator and scanner libraries. Some open source QR code generator libraries may also be available. In an HVAC engineering tool, a QR code generator module may be integrated to generate QR codes for required data. In mobile commissioning applications, a QR code scanner may be integrated to scan a QR code and decode the information in the QR code.

Figure 1:
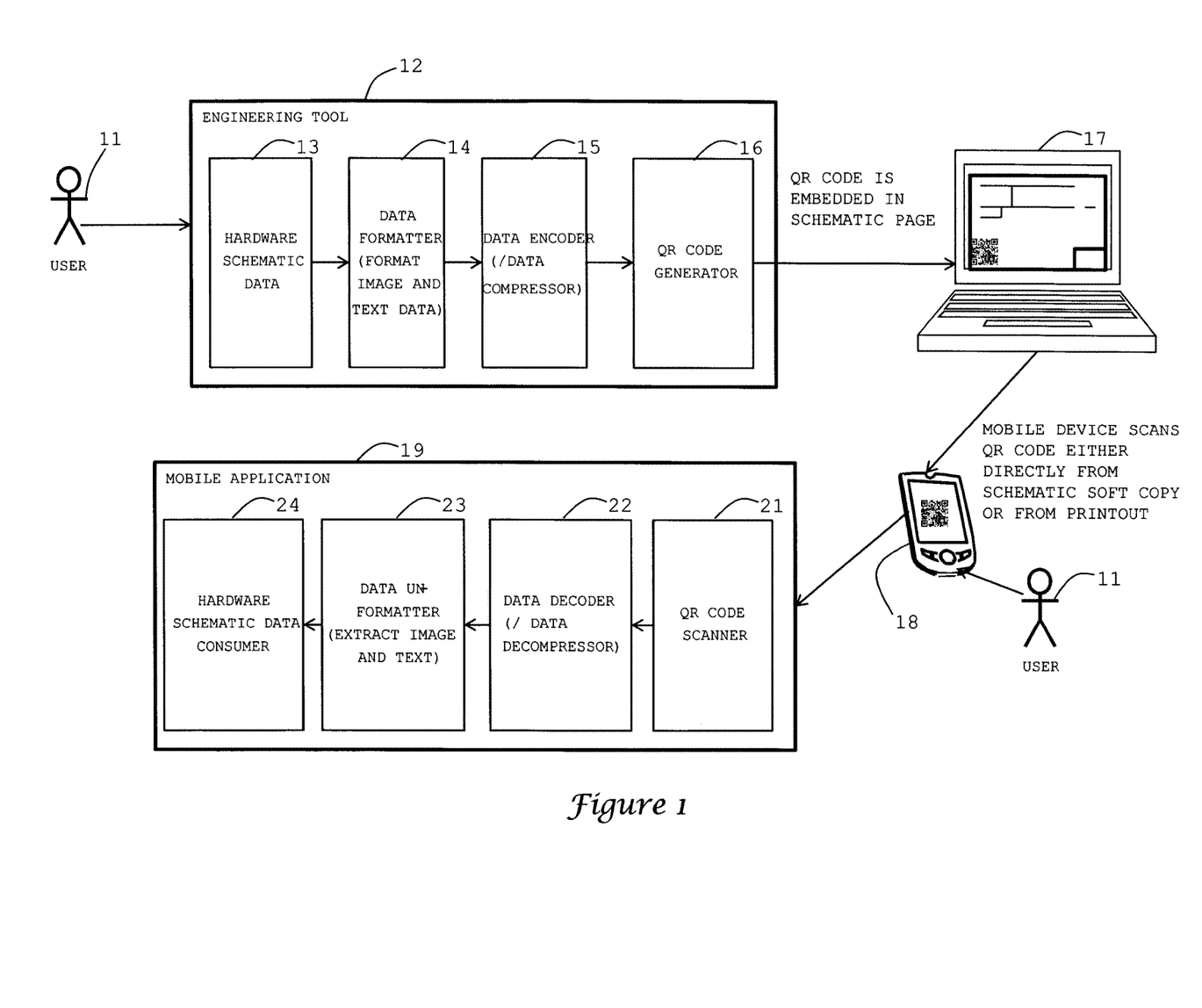
FIG. 1 is a diagram of a transfer of plant schematic data of hardware submittals via a multi-dimensional code.

Steps may be given herein for more than one kind of solution. One solution in FIG. 1 may involve a transfer of plant schematic data of hardware submittals which may incorporate an engineering tool 12 generating a schematic diagram and/or data based on user 11 input in block 13. Tool 12 may format in block 14 an image of the schematic and important text information of the schematic. The formatted image and information may be compressed at block 15 if the total size of the image and information is beyond a QR code size. The compressed image and information may be supplied to a QR generator at block 16 as binary data. The QR generator may generate a QR code for the compressed image and information (i.e., binary schematic data). The QR code as an image may be embedded in the schematic page at a computer 17. A user 11 with a mobile phone 18 may project the phone's camera to the QR code on the schematic diagram from computer 17, such as either directly from schematic soft copy displayed on the monitor or from a printout of the schematic with the embedded QR code. A QR scanner module in block 21 of a mobile application 19 may scan and extract binary data from the QR code. The data may be decoded and decompressed at block 22 and unformatted at block 23 to get image and text information. The schematic image and text information may be made available at block 24 of mobile application 19.

Figure 2:
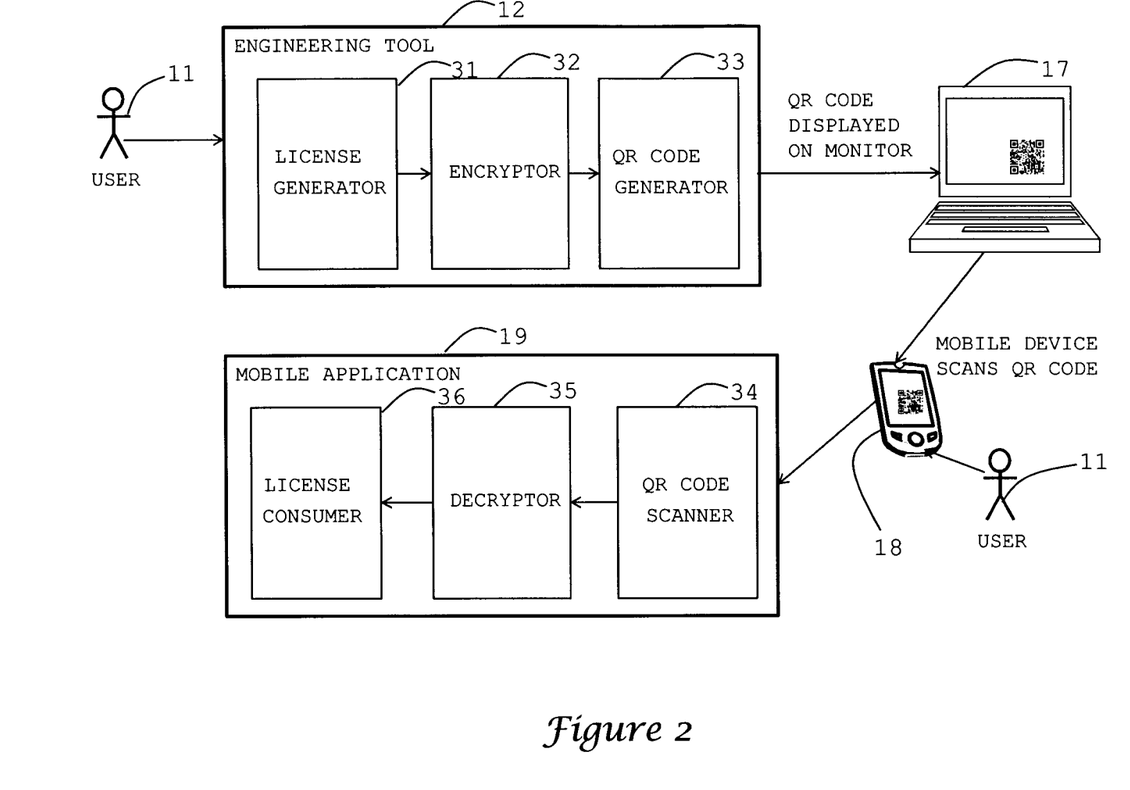
FIG. 2 is a diagram showing a generation and transfer of license data via a multi-dimensional code.

Another solution may involve FIG. 2 being a diagram showing a generation and transfer of license data which may incorporate a user 11 requesting an engineering tool 12 to generate a license at block 31 for a mobile application by giving mobile device details. Engineering tool 12 may generate raw license data and supply the data to an encryptor module at block 32. The encryptor module may encrypt the raw license data and generate encrypted license data. The encrypted license data may be supplied at block 33 to a QR generator as binary data. The QR generator of block 33 may generate a QR code for the encrypted license data and generate the QR code as an image, with the image being displayed on a monitor of computer 17. A user 11 may use a mobile phone 18 and project the phone's camera to the QR code on the monitor of computer 17 and scan the QR code. A QR scanner module at block 34 of mobile application 19 may scan and produce encrypted license data. The encrypted license data may be decrypted at block 35 to produce raw license data. The mobile application 19 may use the raw license data at block 36 to register a license for the mobile application. The data at block 36 may provided to another license consumer or application.

Figure 3:
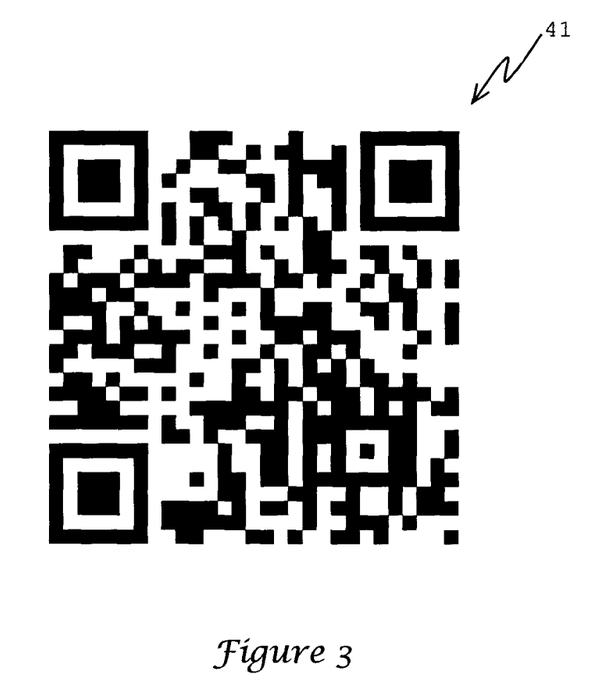
FIG. 3 is a diagram showing an example of a multi-dimensional code containing license related data.

The following items are samples of various kinds of information. One example license QR code may contain license related data as shown by a diagram 41 of the code in FIG. 3. The example may contain data related to device ID=3245 and indicate its validity for 30 days. The information may be in plain text form. A target may generate encrypted license data which is shown in the example.

Figure 4:
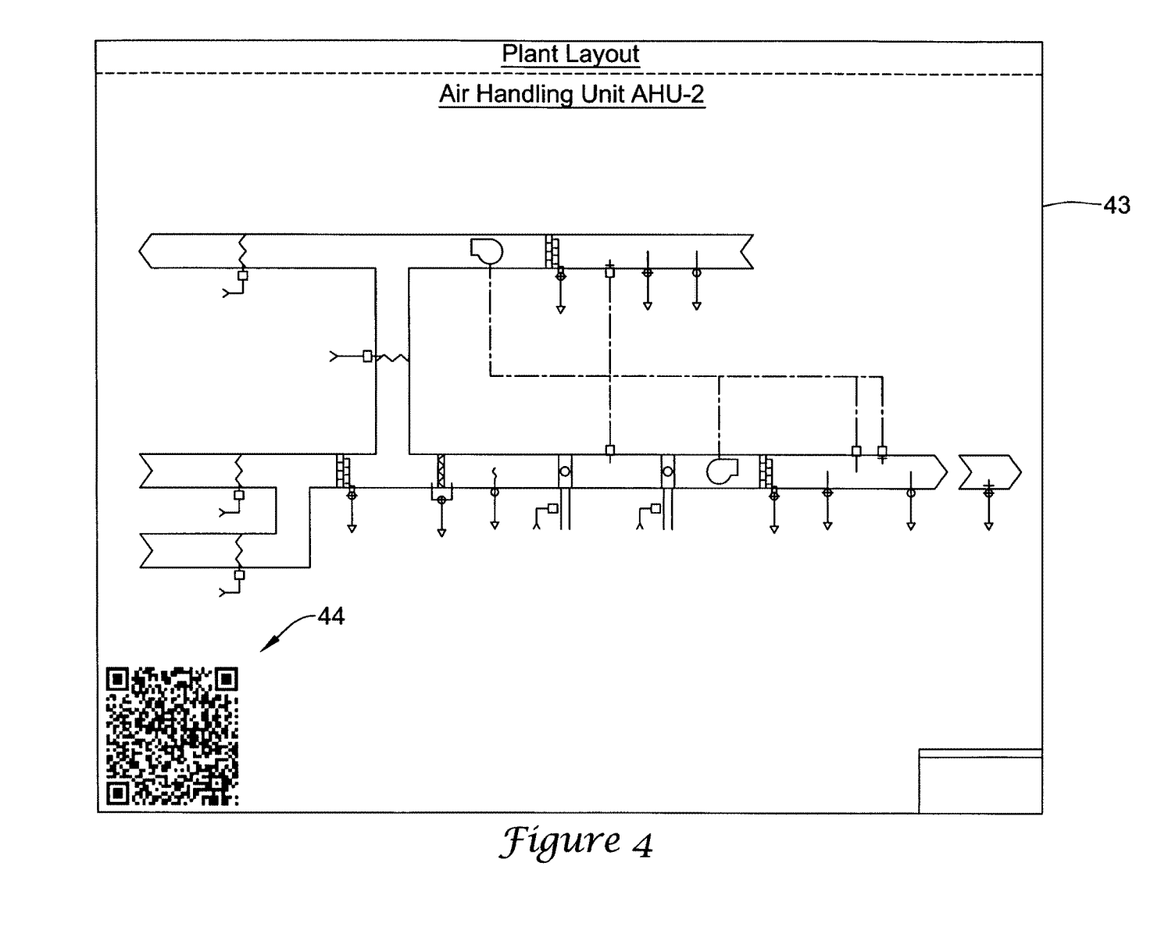
FIG. 4 is a diagram showing an example of a hardware schematic having a compressed image of multi-dimensional code having information about the hardware in the schematic.

Another example may involve an AHU schematic 43 from a submittal as shown in FIG. 4. A QR code 44 for data "Device Id: 130; name=AHU-2; Location: First Floor Mech Room; Data Points=10", may be embedded in schematic 43. A compressed image of code 44 may be generated.

Figure 5:
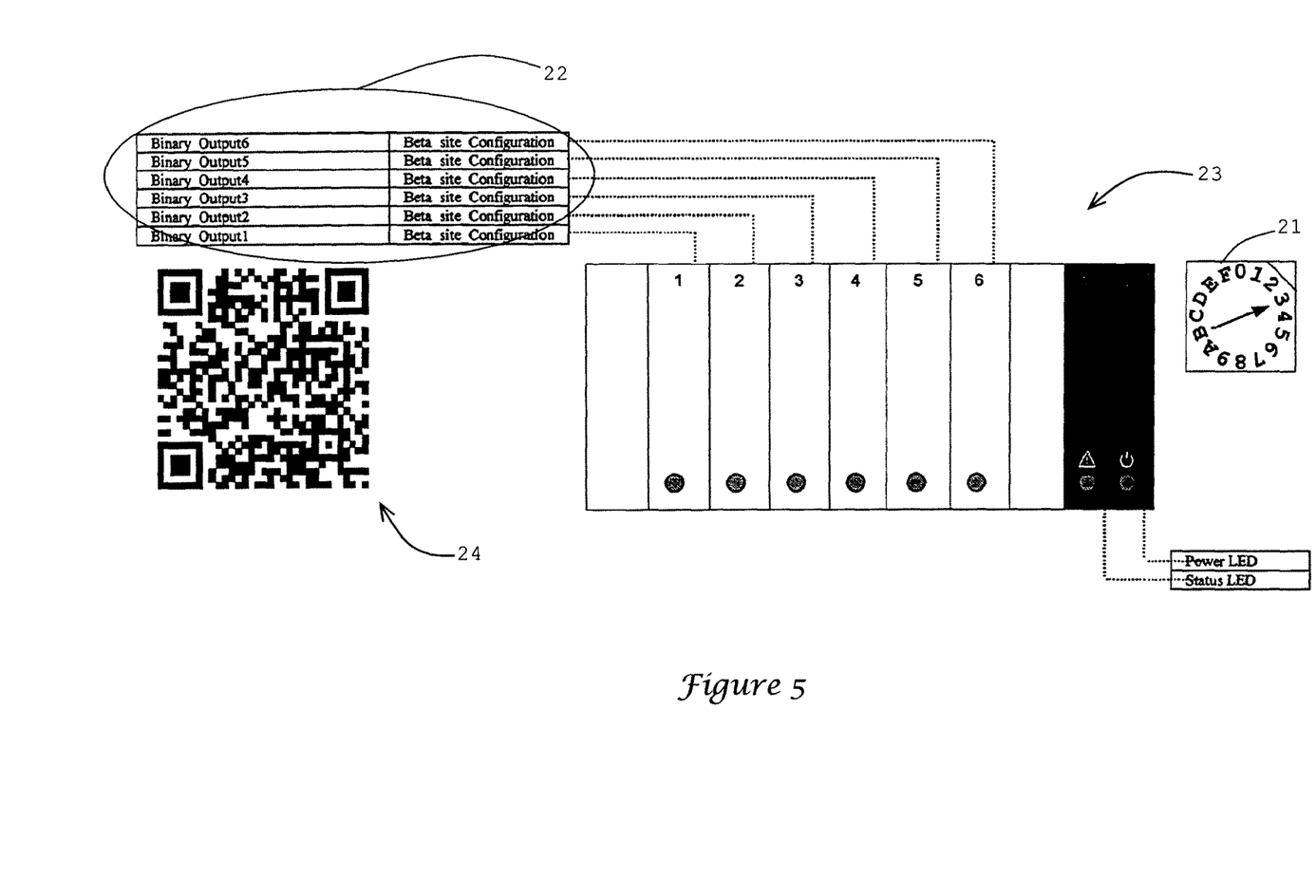
FIG. 5 is a diagram showing an example of a label that reveals a multi-dimensional code with module information that may be embedded in the graphics of a module.

FIG. 5 shows an example with a module label that reveals a quick response code 24 which may be embedded in the module graphics of an XF824 module 23 with a module number 4. In this example, item 21 may indicate a module Id that is configured to the IO module (Module Id=3). Although the QR code given here may contain only an identification and type of the module (i.e., Module Type: XF824; Module ID=4); in the actual field, one may also embed other design and functional details such as how many IOs are on the module, and for what purpose that the IOs are used and which connections are to what points. In this case, module 23 may have has 6 binary outputs. Details of area 22 also may be represented in QR code 24.

Figure 6:
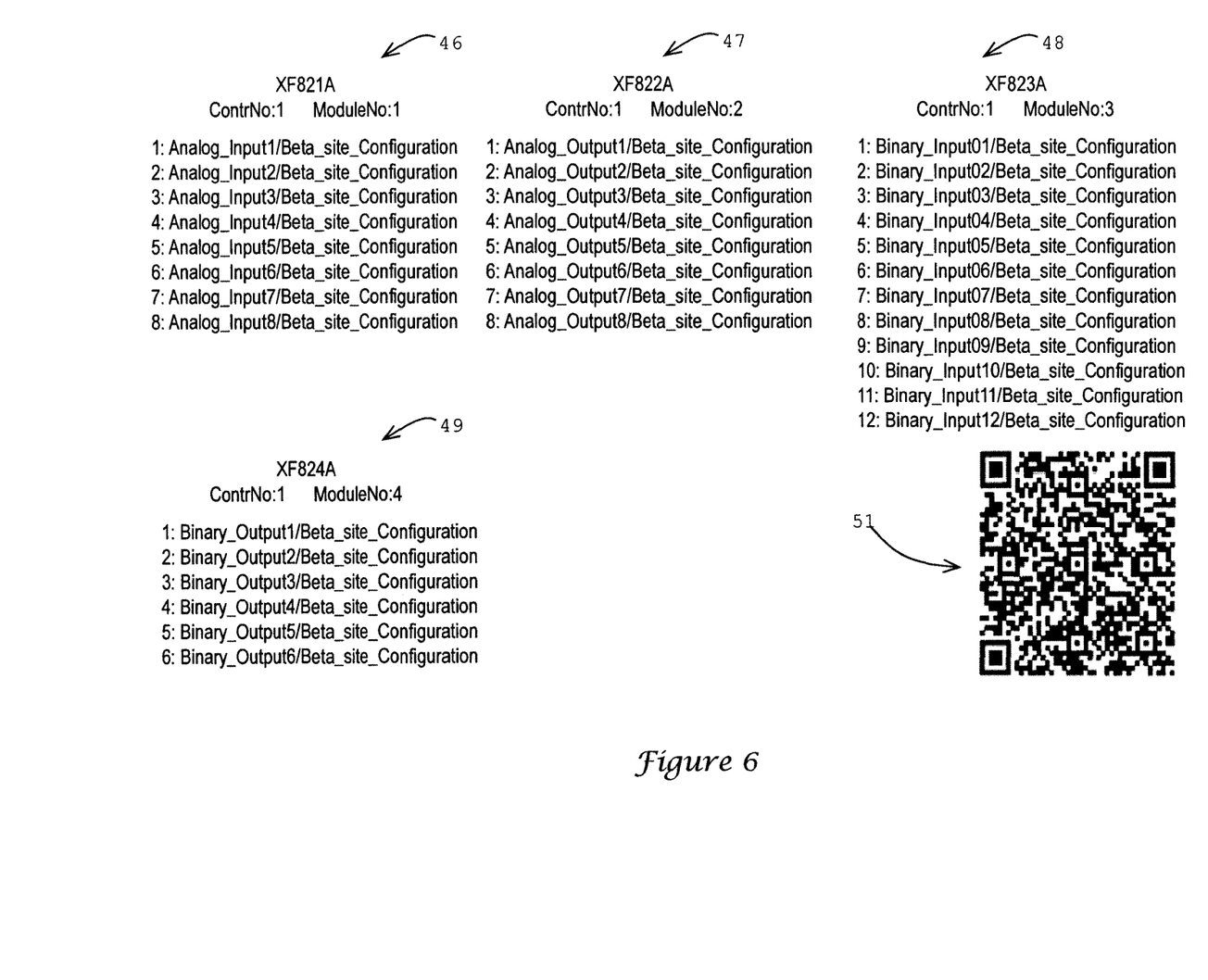
FIG. 6 is a diagram showing an example having a module printed page with data about the module embedded in a multi-dimensional code.

FIG. 6 shows an example having an XL800 module printing page with a QR code 51 for data CID=768, CT=XL800; MID=1, T=XF821A; MID=2, T=XF822A; MID=3, T=XF823A; ID=4, T=XF824A; at locations 46, 47, 48 and 49, respectively, in a module print page. With appropriate encoding, more data may be embedded into QR code 51.

Figure 7:
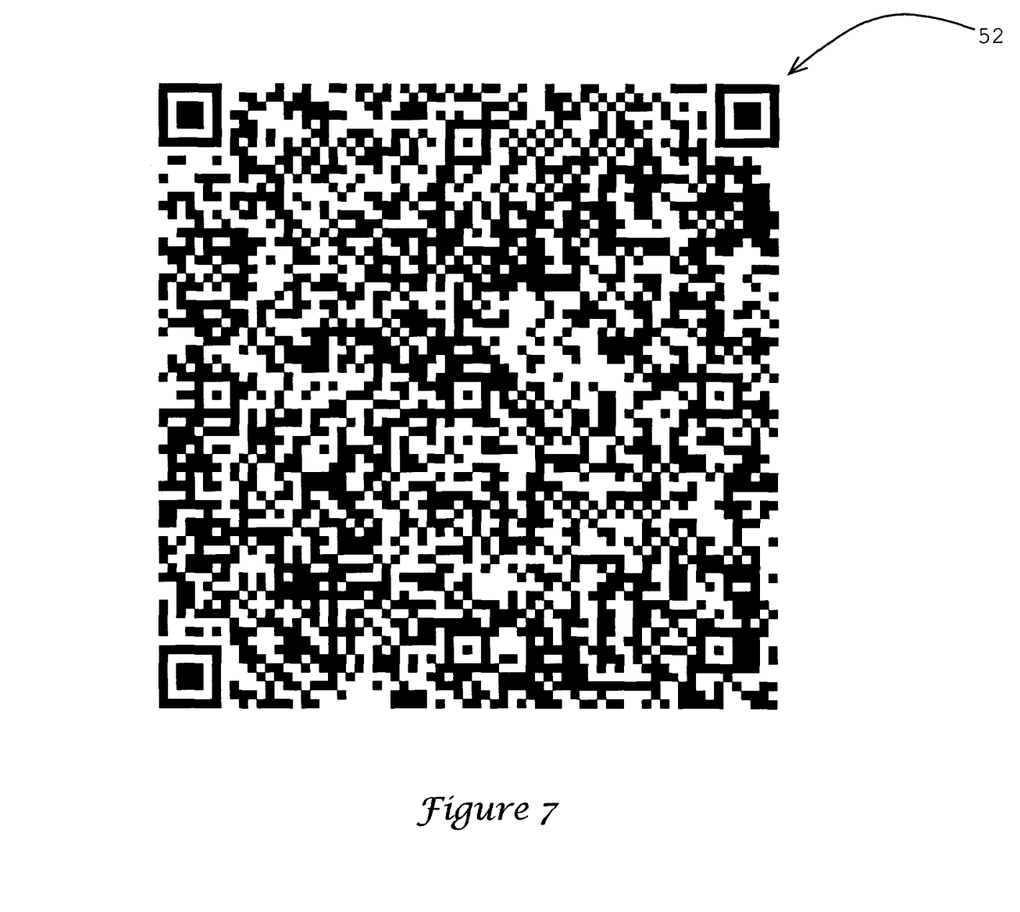
FIG. 7 is a diagram of an example showing a project data with a multi-dimensional code for project data needed for a mobile commissioning application.

FIG. 7 shows an example of HVAC project data with a QR code 52 for project data needed for a mobile commissioning application, incorporating "128, MSSB_L14_2; 129, OT1_Peg1; 130, OT1_Peg2; 131, OT1_F1SW_VAV1; 132, OT1_F1NW_VAV1; 133, OT1_F2SW_VAV1; 134, OT1_F2NW_VAV2; 135, OT1_F3SW_VAV1; 136, OT1_F3NW_VAV1; 137, OT1_F4SW_VAV1; 138, OT1_F4NW_VAV2; 139, OT1_F5SW_VAV1; 140, OT1_F5NW_VAV2; 141, OT1_F6SW_VAV1".

To recap, a system for conveying information may incorporate a generator that generates an electronic version of a submittal page such as a schematic wiring diagram, system architecture, equipment/device schedules, sequence of operations and/or the like of a hardware item, for example, a heating, ventilation and air conditioning system, having an image and/or text, based on input of a user, a formatter that formats the imagery and/or text of the electronic version of the page into a formatted electronic version of the page, a compressor that compresses the formatted electronic version of the page if the electronic version of the page has an electronic size greater than an electronic size of an available multi-dimensional code, an encoder that encodes the formatted electronic version of the page into an encoded formatted electronic version of the page, another generator that generates a multi-dimensional code for the encoded formatted electronic version of the page, and a mechanism that presents a visual version of the multi-dimensional code for the encoded formatted electronic version of the page. An image of the visual version of the multi-dimensional code may be embedded into the encoded formatted electronic version of the page.

The system may further incorporate a mobile device. The mobile device may have a mobile application that enables the mobile device to scan the visual version of the multi-dimensional code of the encoded formatted electronic version of the page, decode the encoded formatted electronic version of the page, decompress as needed a decoded formatted electronic version of the page, and decode the multi-dimensional code into a formatted electronic version of the page.

The mobile device may also scan a visual version of the multi-dimensional code for the encoded formatted electronic version of the page, decode the encoded formatted electronic version of the page, decompress the formatted electronic version of the page if compressed, and un-format the formatted electronic version of the page. The un-formatting of the electronic version of the page may result in an extraction of the image and text from the electronic version of the page. The multi-dimensional code may be a quick response code.

The visual version of the multi-dimensional code may be printed as a label. The label may be attached to the hardware item for the heating, ventilation and air conditioning system.

It can be noted that an encoder may incorporate encryption of a page when the encoder encodes the page. A decoder may incorporate decryption of a page it decodes the page.

A system for conveying license information may incorporate an engineering tool, a processor that runs the engineering tool, and a mobile device having a mobile application. The engineering tool may generate an electronic version of license data for the mobile application based on details of the mobile device. The engineering tool may encrypt the electronic version of the license data into an encrypted electronic version of the license data. The engineering tool may generate a multi-dimensional code of the encrypted electronic version of the license data. The multi-dimensional code may be generated as an image, and the image may be displayed in a visual format. The mobile device may scan the multi-dimensional code from the image displayed in the visual format.

The mobile device may decode the multi-dimensional code into encrypted license data, and decrypt the encrypted license data into license data. The license data may be used for generating and registering a license for the mobile application.

If the multi-dimensional code has a data size that is less than the data size of the electronic version of the license data, then the electronic version of the license data may be compressed prior to being encrypted and the electronic version of the license data may be decompressed after being decrypted. The electronic version may be an electronic binary data version.

The mobile application may have capabilities for scanning, decoding, decrypting and decompressing for the mobile device. The multi-dimensional code may be a two-dimensional quick response code.

An approach for managing imagery and textual information may incorporate generating a document having imagery and/or text with an engineering tool based on input from a user, formatting the imagery and/or text of the document into formatted document binary data, determining a size of an available multi-dimensional code, compressing the formatted document binary data if a size of the formatted document binary data is greater than the size of the available multi-dimensional code, encoding the formatted document binary data into the multi-dimensional code, generating the multi-dimensional code as a visible image, scanning the visible image of the multi-dimensional code, decoding the visible image, and extracting formatted document binary data with a mobile device having an application for scanning, decoding and extracting. The approach may further incorporate de-compressing the formatted document binary data, as needed, and un-formatting the formatted document binary data into imagery and/or text of the document. The document, for example, may pertain to a hardware item of heating, ventilation and air conditioning equipment. A copy of the visible image of the multi-dimensional code may be embedded in the document. The multi-dimensional code may be a two-dimensional quick response code.

The imagery and/or text of the document may incorporate license data for an application of the mobile device. The approach may further incorporate encrypting the license data in the imagery and/or text of the document prior to the formatting the imagery and/or text of the document, and decrypting the license data in the imagery and/or text of the document after the un-formatting the formatted document binary data into imagery and/or text of the document, into decrypted license data. An application of the mobile device may use the decrypted license data to register a license of one or more applications for the mobile device.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A mechanism for conveying Heating, Ventilation, and Air Conditioning (HVAC) system imagery and textual information via a multi-dimensional code, comprising:
    an engineering tool that generates an electronic document having a schematic diagram, based on input from the user, the schematic diagram including at least one of a wiring diagram, a floor plan, or HVAC schematics;
    a formatter that formats the schematic diagram of the electronic document into a formatted image and/or text;
    a compressor having dimensions of a size of a multi-dimensional code and that compresses a total size of the formatted image and/or text to the dimensions of the size of the multi-dimensional code, wherein dimensions of the total size of the formatted document binary data before compression are greater than the dimensions of the size of the multi-dimensional code;
    a converter that converts the compressed formatted image and/or text into binary schematic data;
    an encoder that encodes the binary schematic data and a licensing certificate into the multi-dimensional code;
    a generator that generates the multi-dimensional code for the electronic document as a visible image having dimensions equal to the dimensions of the size of the multi-dimensional code;
    a mechanism that presents a schematic page and embeds the visible image of the multi-dimensional code into the schematic page such that the schematic page includes an encoded copy of the schematic diagram that includes at least one of a wiring diagram, a floor plan, or HVAC schematics;
    a mobile device having an application and configured to scan the visible image of the multi-dimensional code and obtain the licensing certificate, wherein the licensing certificate provides access to the application allowing the mobile device to decode the visible image and extract the binary schematic data independent of a network connection of the mobile device;
    a de-converter on the mobile device that converts the binary schematic data back into the compressed formatted image and/or text;
    a de-compressor on the mobile device that de-compresses the compressed formatted image and/or text back into the formatted image and/or text;
    an un-formatter on the mobile device that un-formats the formatted image and/or text back into the schematic diagram of the electronic document.

2. The mechanism of claim 1, wherein:
    the electronic document pertains to a hardware item of heating, ventilation and air conditioning equipment.

3. The mechanism of claim 2, wherein the multi-dimensional code is a two-dimensional quick response code.

4. The mechanism of claim 1, wherein the schematic diagram of the electronic document comprises device/project data for an application of the mobile device.

5. The mechanism of claim 4, further comprising:
    an encryptor that encrypts the device/project data in the schematic diagram of the electronic document prior to formatting the schematic diagram into the formatted image and/or text; and
    a decryptor that decrypts the device/project data in the schematic diagram of the electronic document after the un-formatting of the formatted image and/or text, into decrypted device/project data.

6. The mechanism of claim 5, wherein an application of the mobile device uses the decrypted device/project data to register a license of one or more applications for the mobile device.

7. The mechanism of claim 6, wherein the multi-dimensional code is a quick response code.

8. A method for managing Heating, Ventilation, and Air Conditioning (HVAC) system imagery and textual information, comprising:
    generating an electronic document having a schematic diagram with an engineering tool based on input from a user, the electronic document including at least one of a wiring diagram, a floor plan, or HVAC schematics;
    formatting the schematic diagram of the electronic document into a formatted imagery and/or text;
    determining dimensions of a size of an available multi-dimensional code, wherein dimensions of a total size of the formatted imagery and/or text is greater than the dimensions of the size of the available multi-dimensional code;
    compressing the total size of the formatted imagery and/or text to the dimensions of the size of the available multi-dimensional code;

converting the compressed formatted imagery and/or text into binary schematic data;
encoding the binary schematic data and a licensing certificate into the available multi-dimensional code;
generating the available multi-dimensional code as a visible image having dimensions equal to the dimensions of the size of the multi-dimensional code;
presenting a schematic page and embedding a the visible image of the multi-dimensional code into the schematic page such that the schematic page includes an encoded copy of the schematic diagram that includes at least one of a wiring diagram, a floor plan, or HVAC schematics;
scanning the visible image of the multi-dimensional code and obtain the licensing certificate, decoding the visible image, and extracting the binary schematic data with a mobile device having an application, wherein the licensing certificate provides access to the application allowing the mobile device to decode the visual image and extract the binary schematic data independent of a network connection of the mobile device;
on the mobile device, converting the binary schematic data back into the compressed formatted imagery and/or text;
on the mobile device, de-compressing the compressed formatted imagery and/or text back into the formatted imagery and/or text; and
on the mobile device, un-formatting the formatted imagery and/or text into the schematic diagram of the electronic document.

9. The method of claim 8, wherein:
the electronic document pertains to a hardware item of heating, ventilation and air conditioning equipment.

10. The method of claim 8, wherein the multi-dimensional code is a two-dimensional quick response code.

11. The method of claim 8, wherein the schematic diagram of the electronic document comprises device/project data for an application of the mobile device.

12. The method of claim 11, further comprising:
encrypting the device/project data in the schematic diagram of the electronic document prior to formatting the schematic diagram into the formatted imagery and/or text; and
decrypting the device/project data in the schematic diagram of the electronic document after the un-formatting of the formatted imagery and/or text, into decrypted device/project data.

13. The method of claim 12, wherein an application of the mobile device uses the decrypted device/project data to register a license of one or more applications for the mobile device.

14. The method of claim 13, wherein the multi-dimensional code is a quick response code.

* * * * *